United States Patent
Takemura

(10) Patent No.: US 7,488,113 B2
(45) Date of Patent: Feb. 10, 2009

(54) ROLLER BEARING FOR BELT-TYPE STEPLESS SPEED CHANGER

(75) Inventor: Hiromichi Takemura, Kanagawa (JP)

(73) Assignee: NSK Ltd., Tokyo (JP)

( * ) Notice: Subject to any disclaimer, the term of this patent is extended or adjusted under 35 U.S.C. 154(b) by 658 days.

(21) Appl. No.: 10/553,070

(22) PCT Filed: Mar. 19, 2004

(86) PCT No.: PCT/JP2004/003728

§ 371 (c)(1),
(2), (4) Date: Oct. 13, 2005

(87) PCT Pub. No.: WO2004/092603

PCT Pub. Date: Oct. 28, 2004

(65) Prior Publication Data

US 2006/0204157 A1    Sep. 14, 2006

(30) Foreign Application Priority Data

Apr. 16, 2003    (JP) ............................. 2003-111618

(51) Int. Cl.
*F16C 33/34*    (2006.01)
*F16C 19/00*    (2006.01)

(52) U.S. Cl. ...................................... 384/568; 384/450

(58) Field of Classification Search .................. 384/450, 384/565, 568, 569, 571, 618, 619
See application file for complete search history.

(56) References Cited

U.S. PATENT DOCUMENTS

| | | | | |
|---|---|---|---|---|
| 4,802,775 A | * | 2/1989 | Takata | 384/450 |
| 6,227,711 B1 | * | 5/2001 | Kellstrom et al. | 384/450 |
| 6,390,685 B1 | * | 5/2002 | Shimomura et al. | 384/568 |

FOREIGN PATENT DOCUMENTS

| | | |
|---|---|---|
| JP | 2-24152 U | 2/1990 |
| JP | 4-84857 U | 7/1992 |
| JP | 5-22845 U | 3/1993 |
| JP | 8-30526 B2 | 3/1996 |
| JP | 2001-124089 A | 5/2001 |
| JP | 2002-188644 A | 7/2002 |
| JP | 2002-339977 A | 11/2002 |

* cited by examiner

*Primary Examiner*—Richard W Ridley
*Assistant Examiner*—James Pilkington
(74) *Attorney, Agent, or Firm*—Sughrue Mion, PLLC

(57) ABSTRACT

In a cylindrical roller bearing 20 for continuously variable belt and pulley transmissions which is used at rotational support portions of a continuously variable belt and pulley transmission and in which a plurality of cylindrical rollers 23 are rollably provided in a circumferential direction between an outer ring 21 and an inner ring 22, a raceway surface 23a of the cylindrical roller 23 is made to take the shape of a full crowning, and a radius curvature R of the full crowning is made to satisfy a relationship of $0.01 \leq L^2/(Da \times R) \leq 0.03$ relative to a diameter Da and a roller length L of the cylindrical roller 23.

3 Claims, 3 Drawing Sheets

ROLLER BEARING FOR BELT-TYPE STEPLESS SPEED CHANGER

TECHNICAL FIELD

The present invention relates to a roller bearing for continuously variable belt and pulley transmissions and more particularly to a roller bearing for continuously variable belt and pulley transmission which can stabilize the friction coefficient between an endless belt and pulleys and can prevent a premature flaking that is generated while being durable even under a condition where a CVT fluid (a fluid that doubles as an ATF) with a low viscosity is used in order to realize a low fuel consumption.

BACKGROUND ART

As automotive continuously variable belt and pulley transmissions, for example, a continuously variable belt and pulley transmission is known that is described in Japanese Patent Unexamined Publication No. JP-A-8-30526.

Such a continuously variable belt and pulley transmission has an input-side rotational shaft 1 and an output-side rotational shaft 2 which are disposed in parallel with each other. The input-side rotational shaft 1 is driven to rotate by an engine 3 via a torque converter 4 and a starter clutch, which is an electromagnetic clutch or the like. Then, the rotation of the output-side rotational shaft 2 is transmitted to a pair of left and right drive wheels 10 via a speed reduction gear train 8 and a differential gear 9.

These input-side rotational shaft 1 and output-side rotational shaft 2 are each supported rotatably by a pair of roller bearings 5, 6 within a transmission case, not shown.

A drive-side pulley 11 is provided at an intermediate portion of the input-side rotational shaft 1, so that the drive-side pulley 11 and the input-side rotational shaft 1 are designed to rotate in synchronism with each other. The space between a pair of drive-side pulley plates 12, 12 which make up the drive-side pulley 11 can be adjusted freely by means of a drive-side displacement unit, not shown. Namely, the width of a raceway groove in the drive-side pulley 11 can freely be widened and narrowed by means of this drive-side displacement unit.

In addition, a driven-side pulley 13 is provided at an intermediate portion of the output-side rotational shaft 2, so that the driven-side pulley 13 and the output-side rotational shaft 2 are designed to rotate in synchronism with each other. The space between a pair of driven-side pulley plates 14, 14 which make up the driven-side pulley 13 can be adjusted freely by means of a driven-side displacement unit, not shown. Namely, the width of a raceway groove in the driven-side pulley 13 can freely be widened and narrowed by means of this driven-side displacement unit. Then, an endless belt 15 is extended between the driven-side pulley 13 and the drive-side pulley 11.

In the variably continuous belt and pulley transmission that is configured as has been described heretofore, power that has been transmitted from the engine to the input-side rotational shaft 1 via the torque converter 4 and the starter clutch is then transmitted to the driven-side pulley 13 from the drive-side pulley 11 via the endless belt 15.

Note that as this endless belt 15, there are known an endless belt which transmits power in compression and an endless belt which transmits power under tension. In either case, the power that has been transmitted to the driven-side pulley 13 is transmitted from the output-side rotational shaft 2 to the drive wheels 10 via the speed reduction gear train 8 and the differential gear 9.

Then, when the speed ratio between the input-side rotational shaft 1 and the output-side rotational shaft 2 is changed, the raceway grooves of the drive-side pulley 11 and the driven-side pulley 13 are widened and/or narrowed in relation to each other.

For example, when the speed ratio between the input-side rotational shaft 1 and the output-side rotational shaft 2 is increased, the width of the raceway groove of the drive-side pulley 11 is increased, whereas the width of the raceway groove of the driven-side pulley 13 is narrowed. As a result, the wrap contact diameters of portions of the endless belt 15 which are wound around the drive-side pulley 11 and the driven-side pulley 13 change in such a manner that the wrap contact diameter of the portion of the endless belt 15 which is wound around the drive-side pulley 11 is decreased, whereas the wrap contact diameter of the portion of the endless belt 15 which is wound around the driven-side pulley 13 is increased, whereby a speed reduction is implemented between the input-side rotational shaft 1 and the output-side rotational shaft 2.

In contrast, when the speed increase ratio between the input-side rotational shaft 1 and the output-side rotational shaft 2 is increased (the speed reduction ratio is decreased), the width of the raceway groove of the drive-side pulley 11 is narrowed, whereas the width of the raceway groove of the driven-side pulley 13 is widened.

In the continuously variable belt and pulley transmission that is configured as has been described heretofore, in order to realize a low fuel consumption by increasing to stabilize the friction coefficient between the metallic endless belt and pulleys, while lubrication is implemented using a CVT fluid (a fluid that double as an AFT) with 100 cc/min or greater, since there is a high possibility that wear dust resulting from the frictional contact between the endless belt and the pulleys and gear dust enter the roller bearings which support the pulleys, the size of the bearings is increased or the diameter of the rolling element is increased, and a bearing needs to be designed in which the basic kinematic rated load is increased using, for example, a roller bearing.

Incidentally, in the utilization of a cylindrical roller bearing, generally, in order to prevent the generation of edge load, a crowning is applied to a raceway surface of a cylindrical roller or raceway surfaces of bearing rings. As a crowning like this, there are known a full crowning in which a generator of the rolling surface or raceway surface is made into an arc with a constant curvature, a trapezoidal crowning in which a taper surface which recedes away from the raceway surface (the rolling surface) is formed at each edge portion of the rolling surface (or the raceway surface) and a logarithmic crowning in which the generator of the rolling surface of the raceway surface is made into a logarithmic curve.

For example, Japanese Utility Model Unexamined Publication No. JP-UM-A-5-22845 discloses a roller bearing is disclosed in which a number of rollers are provided rollably between inner and outer bearing rings, the rollers are brought into line contact with the respective bearing rings, and guide collars are formed at both edges of one of the bearing rings, as well as a technique in which a trapezoidal crowning is formed on a raceway surface of the bearing ring which is provided with the guide collars by applying crowning to both collar sides of the raceway surface of the bearing ring except for a central straight line portion thereof, and a full crowning is applied to a raceway surface of the other bearing ring which is provided with no guide collar.

In addition, Japanese Patent Unexamined Publication No. JP-A-2001-124089 discloses a technique in which in order to equalize stress on the rolling surface of a cylindrical roller, a crowning is applied to the rolling surface of the cylindrical roller in which a drop amount Y at an arbitrary position is expressed as a function of an axial distance X from an axial center M to the arbitrary position $\{Y=AX^B$ (A, B denote arbitrary numbers)$\}$, and the axial length L1 of an area where the drop amount Y becomes 5 μm or smaller (Y1) is set to 50% or greater of the axial length L0 of the cylindrical roller, and furthermore a maximum value Y0 of the drop amount Y is set to 0.15% or greater of the axial length L0 of the cylindrical roller.

However, when a full crowning and a trapezoidal crowning are applied to the raceway surface and the rolling surface of the roller in a general cylindrical roller bearing, there occurs a problem that in the event that the crowning is enlarged in order to prevent an edge load that is generated when the bearing rings and the cylindrical rollers are inclined due to a moment of larger magnitude acting on the bearing, the load capacity is decreased.

In addition, in the case of the logarithmic crowning, since the configuration is complex, there is caused a problem that the machining becomes difficult and hence costs are increased.

Furthermore, while an outer ring, an inner ring and roller elements of a standard bearing steel of classification 2 (SUJ2) are used in each of the roller bearings that are incorporated in the aforesaid continuously variable belt and pulley transmission, there exists a tendency to use a CVT fluid with low viscosity in order to secure the efficiency (low fuel consumption) of the continuously variable belt and pulley transmission, keep the level of noise generated during driving to a lower level, and suppress the wear of the drive-side and driven-side pulleys and the endless belt.

Then, in rolling bearings using the standard bearing steel of classification 2, it is considered that not a dent originating type flaking, which is generated by inclusion of foreign matters caused by vibrations generated in association with change in belt, but a premature flaking is generated by virtue of the occurrence of metal contact between the bearing rings and the roller elements that results from rotation slippage, revolution slippage, differential slippage and skew.

This is because since a CVT fluid with low viscosity (the basic oil kinematic viscosity is 40 mm²/sec or smaller at 40°, 10 mm²/sec or smaller at 100° C.) is used as a lubricating oil under an environment in which the bearing temperature exceeds 100° C., it is anticipated that the amount of lubrication in the interior of the bearing is equal to or less than what is assumed (insufficient lubrication), resulting in chronic formation of insufficient oil film.

In addition, since the transmission case of a continuously variable belt and pulley transmission has a low housing rigidity, an oil film failure occurs between the roller element and the surface of the raceway due to the effect of the aforesaid slippages in association with the deformation of the raceway surface of the outer ring, and the raceway surface becomes activated, whereby by virtue of the intrusion of, for example, hydrogen, a hydrogen-attributed brittle flaking and a surface fatigue in association with the metal contact are promoted, leading to a problem that a premature flaking occurs.

Consequently, even with the specification, being the advantage and object of JP-UM-A-5-22845 and JP-A-2001-124089, in which in a utilizing condition where the inner and outer rings have a relative inclination angle, since the application of appropriate crowning to the raceway surfaces of the inner and outer rings eliminates the occurrence of edge load and excludes a numerical restriction to a single curvature, prying generated at edge surfaces of the roller is not generated at the guide collars, as well, there can be provided no countermeasures against the premature flaking that occurs on roller bearings for continuously variable belt and pulley transmissions.

Consequently, the invention was made in view of these situations, and an object thereof is to prove a roller bearing for continuously variable belt and pulley transmissions which can realize a continuously variable belt and pulley transmission which provides a low fuel consumption and has a superior transmission efficiency and a sufficient durability.

DISCLOSURE OF THE INVENTION

With a view to attaining the object, according to the invention, there is provided a roller bearing for continuously variable belt and pulley transmission which is used at rotational supporting portions of a continuously variable belt and pulley transmission and in which a plurality of rollers are rollably provided in a circumferential direction between an outer ring raceway and an inner ring raceway, characterized in that;

at least one of an outer ring raceway surface, an inner ring raceway surface and a roller raceway surface (also referred to as a rolling surface) of the roller is a shape of a full crowning, and that a radius curvature R of the full crowning is made to satisfy a relationship of $0.01 \leq L^2/(Da \times R) \leq 0.03$ relative to a diameter Da and a roller length L of the roller.

According to the roller bearing for continuously variable belt and pulley transmission that is configured as has been described above, an optimal dimensions design of the bearing is enabled, and even under a condition in which the temperature is such a high temperature of, for example, 100° C. and a lubricating oil with low viscosity is used, the surface fatigue is delayed, even in case a metal contact occurs on the raceway surface which is attributed to a slippage such as skew, and hence the premature flaking can be prevented.

Then, by obtaining the optimal dimensional bearing configuration, the weight of the roller bearing can be reduced, and an optimal durability can also be secured. By selecting the bearing that is given the optical dimensional configuration that has been described above, even in case a sufficient lubricating oil amount of 20 cc/min or greater cannot be secured, the duration of life of the bearing can be satisfied, and the miniaturization and securing of high rigidity, which are needs specific to roller bearings for continuously variable belt and pulley transmissions, become compatible.

As a result, abnormal friction that occurs when the belt and the pulleys contact only at one side thereof can be prevented without enlargement of the bearing.

Note that the inner ring raceway may be constituted by the inner ring or the rotational shaft, and the inner ring raceway surface is formed on the inner ring or the rotational shaft.

BRIEF DESCRIPTION OF THE DRAWINGS

FIG. 1(*b*) is a partial side view of a cylindrical roller;

Figure 1:
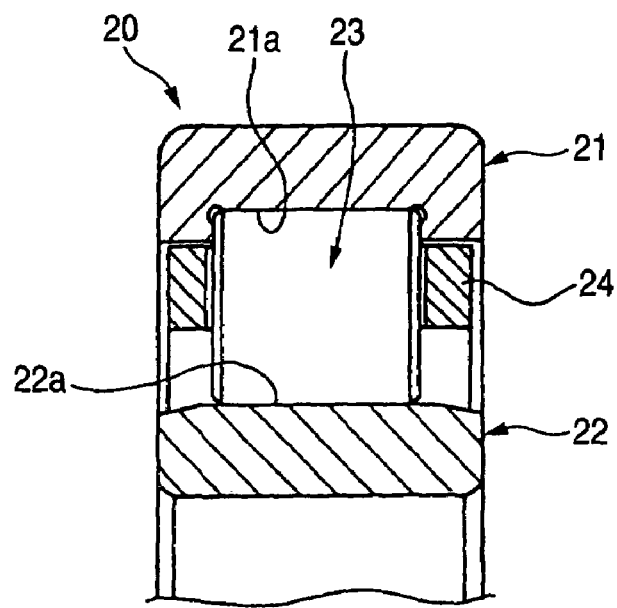
FIG. 1(*a*) is a partial sectional view of a cylindrical roller bearing for continuously variable belt and pulley transmissions according to a first embodiment of the invention.
Figure 1:
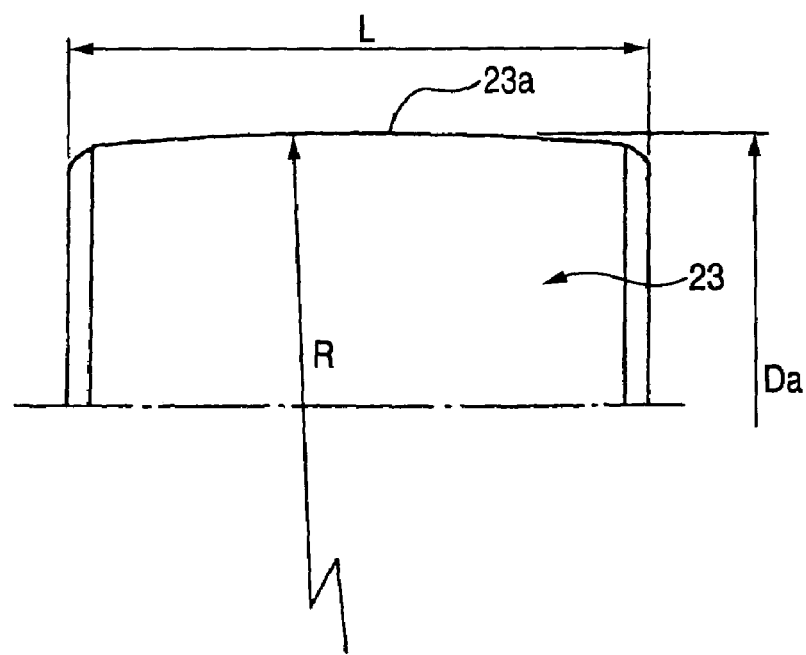

Note that in the drawings, reference numeral 20 denotes a cylindrical roller bearing for continuously variable belt and pulley transmissions, 21 denoting an outer ring, 22 an inner ring and 23 a cylindrical roller.

BEST MODE FOR CARRYING OUT THE INVENTION

Hereinafter, based on the accompanying drawings, cylindrical roller bearings for continuously variable belt and pulley transmissions according respective embodiments of the invention will be described in detail. Note that a continuously variable belt and pulley transmission will be described using FIG. 2.

First Embodiment

Figure 2:
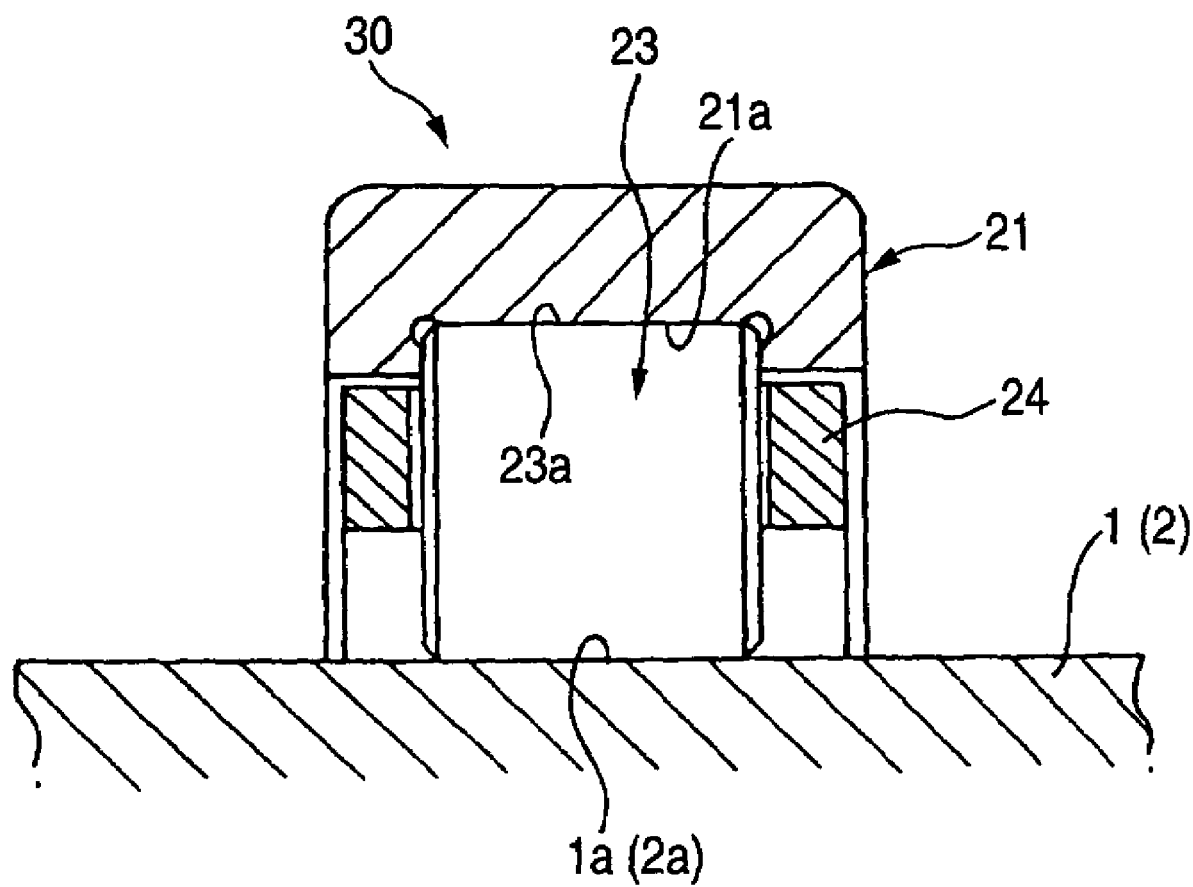
FIG. 2 is a partial sectional view of a cylindrical roller bearing for continuously variable belt and pulley transmissions according to a second embodiment of the invention.

A cylindrical roller bearing 20 for continuously variable belt and pulley transmissions according to a first embodiment of the invention has, as shown in FIG. 1(a), a plurality of cylindrical rollers 23 which are arranged rollably in a circumferential direction between an outer ring (an outer ring raceway) with two collars in which an outer ring raceway surface 21a is formed on an inner circumferential surface thereof and an inner ring (an inner ring raceway) with no collar in which an inner ring raceway surface 22a is formed on an outer circumferential surface thereof via a retainer 24 and is used as a bearing which rotatably supports an input-side rotational shaft 1 and an output-side rotational shaft 2 of a continuously variable belt and pulley transmission shown in FIG. 2.

Furthermore, in the cylindrical roller bearing 20 for continuously variable belt and pulley transmissions, as shown in FIG. 1(b), a raceway surface (a rolling surface) 23a of the cylindrical roller 23 is made to take the shape of a full crowning, and a radius curvature R of the full crowning is made to satisfy a relationship of $0.01 \leq L^2/(Da \times R) \leq 0.03$ relative to a diameter Da and a roller length L of the cylindrical roller 23.

Namely, according to the cylindrical roller bearing 20 for continuously variable belt and pulley transmission that is configured as has been described above, an optimal dimensions design of the bearing is enabled, and even under a condition in which the temperature is such a high temperature of, for example, 100° C. and a lubricating oil with low viscosity is used, the surface fatigue is delayed, even in case a metal contact occurs on each raceway surface which is attributed to a slippage such as skew, and hence the premature flaking can be prevented.

Then, by obtaining the optimal dimensional bearing configuration, the weight of the roller bearing can be reduced, and an optimal durability can also be secured. By selecting the bearing 20 for continuously variable belt and pulley transmissions that is given the optical dimensional configuration that has been described above, even in case a sufficient lubricating oil amount of 20 cc/min or greater cannot be secured, the duration of life of the bearing can be satisfied, and the miniaturization and securing of high rigidity, which are needs specific to roller bearings for continuously variable belt and pulley transmissions, become compatible.

As a result, abnormal friction that occurs when the belt and the pulleys contact only at one side thereof can be prevented without enlargement of the bearing.

Consequently, a continuously variable belt and pulley transmission can be realized which prevents the premature flaking that is generated on cylindrical roller bearings for continuously variable belt and pulley transmissions while being durable, increases the transmission efficiency and suppresses the premature failure of an endless belt, even in case it is used in a condition where a CVT fluid (or a fluid that doubles as an ATF) with low viscosity is used as a lubricating oil at high temperatures in order to realize low fuel consumption by stabilizing the friction coefficient between an endless belt 15 and drive-side and driven-side pulleys 13 of the continuously variable belt and pulley transmission.

In addition, in the case of the continuously variable belt and pulley transmissions in which there is produced a great deal of wear powder from the friction contact between the pulleys and the belt, in order to suppress the dent originating type flaking, case hardening steel is used for the material of at least one or more of the outer ring, the inner ring and the cylindrical rollers, which constitute a weakest location, and a carburizing or carbo-nitriding treatment is applied thereto, so that the remaining austenite amount is made to be on the order of 20 to 45%, whereby the resulting bearing has a long life.

Furthermore, since the residual compressive stress on the raceway surface is increased by implementing the carburizing or carbo-nitriding treatment, it is considered that the propagation of minute cracks is suppressed which induces the hydrogen-attributed brittle flaking, further effectiveness being provided.

In addition, as to the retainer, in a case where it is used at much higher rotational speeds, the retainer, by being made of plastics, can have a further extended duration of life.

Second Embodiment

Figure 3:
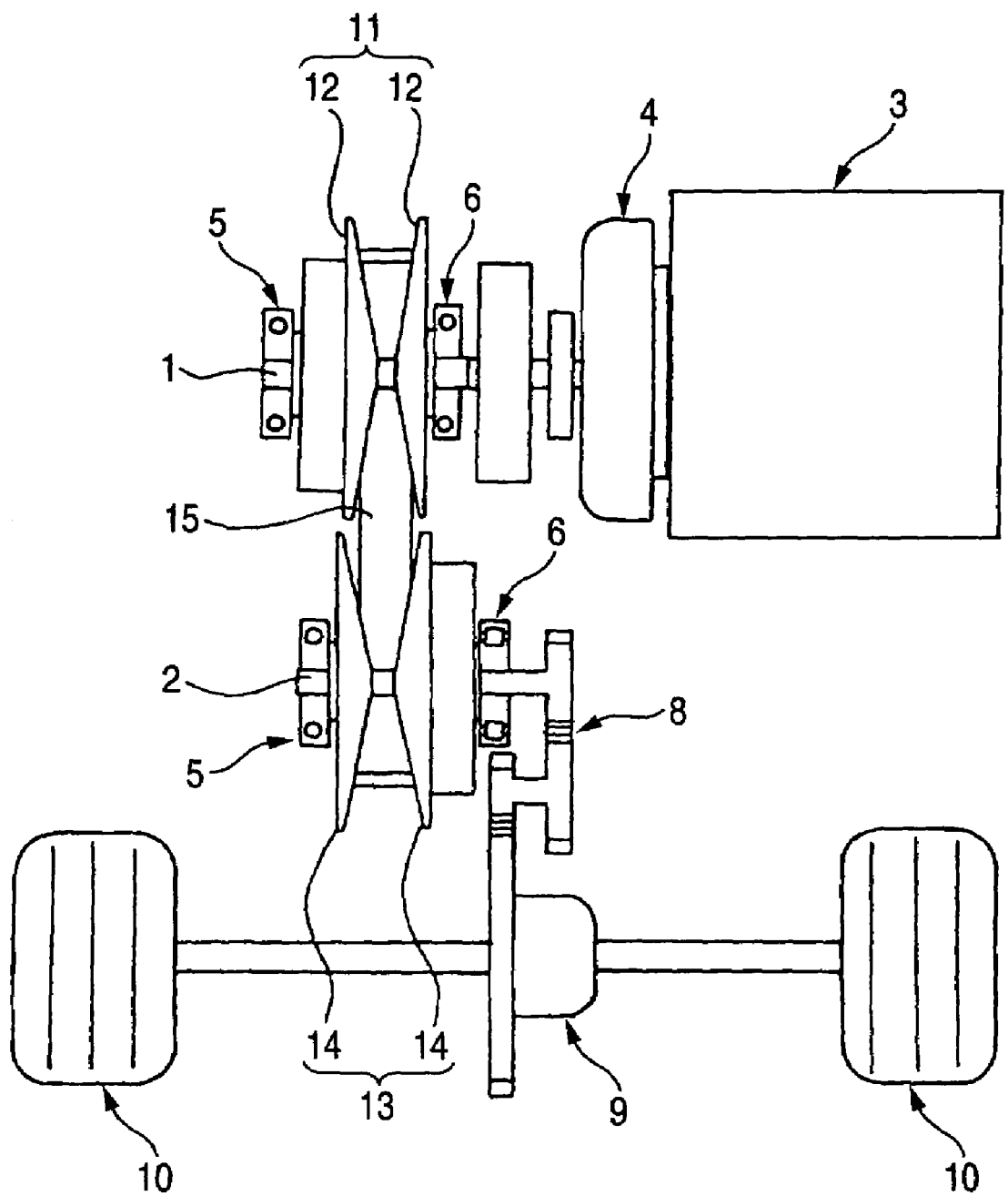
FIG. 3 is a schematic drawing which shows an example of a continuously variable belt and pulley transmission.

Next, a cylindrical roller bearing for continuously variable belt and pulley transmissions according to a second embodiment of the invention will be described by reference to FIG. 3. Note that like reference numerals will be imparted to like portions to those described the first embodiment and the description thereof will be omitted.

A cylindrical roller bearing 30 for continuously variable belt and pulley transmissions according to this embodiment is a bearing which supports rotatably an input-side rotational shaft 1 or an output-side rotational shaft 2 of a continuously variable belt and pulley transmission and has, as shown in FIG. 2, a plurality of cylindrical rollers 23 which are rollably provided in a circumferential direction between an outer ring (an outer ring raceway) with two collars in which an outer ring raceway surface 21a is formed on an inner circumferential surface thereof and the input-side rotational shaft 1 or the output-side rotational shaft 2 in which an inner ring raceway surface 1a (or 2a) is formed on an outer circumferential surface thereof via a retainer 24.

The other configuration features thereof are similar to those of the first embodiment, and the cylindrical roller bearing 30 for continuously variable belt and pulley transmissions of this embodiment has the similar function to that of the first embodiment.

Note that the bearings for continuously variable belt and pulley transmissions of the invention are not such as to be limited to the embodiments, and examples that will be described below and hence it goes without saying that various forms can be adopted based on the spirit of the invention.

For example, while, in the embodiments, only the raceway surfaces of the cylindrical roller takes the shape of full crowning, the invention is not limited thereto but may be effectively applied to all continuously variable belt and pulley transmissions in which at least one of an outer ring raceway surface, an inner ring raceway surface and a roller raceway surface takes the shape of full crowning.

EXAMPLES

With a view to verifying the functions and advantages of the invention that have been described above, experiments were carried out on cylindrical roller bearings for continuously variable belt and pulley transmissions of Examples 1 to 6 which were made according to the first embodiment and cylindrical roller bearings for continuously variable belt and pulley transmissions of Comparison Examples 1 to 4 under the following conditions.

Note that in these examples, in order to evaluate only the cylindrical roller bearing which supports a front end of the input-side rotational shaft (the primary shaft), the other cylindrical roller bearings were tested under a lubricating condition in which the lubricating oil amount of CVT fluid is 100 cc/min.

In addition, test bearings were made of the bearing steel classified as SUJ2 and were prepared through the normal heat treatment, and as to inner rings and outer rings, the carbonitriding treatment was given to the case hardening steel so as to suppress the reduction in the duration of life. The raceway surface of the cylindrical rollers was made to take the shape of full crowning, and in order to verify the effectiveness thereof, the material for the cylindrical rollers was set to undergo the normal heat treatment so as to constitute a weakest location.

The cylindrical roller bearings for use for experiments were constituted by roller bearings classified under JIS Number NU207 (inside diameter φ 35 mm×outside diameter φ 72 mm×width 17 mm, roller diameter Da=9 mm, roller length L=9 mm) and novel bearings (inside diameter φ 35 mm×outside diameter φ 72 mm×width 23 mm) which were given a roller length L of 13 mm, and the full crowning amount (radius of curvature R) of the individual bearings was varied to have test samples of Examples 1 to 6 and Comparison Examples 1 to 4.

Note that the surface roughness of the bearing rings was in the normal range of 0.05 to 0.4 μm Ra and the surface roughness of the cylindrical roller was in the range of 0.05 to 0.4 μm Ra. In addition, an iron retainer was used as the retainer.

Then, the cylindrical roller bearings of Example 1 to 6 and Comparison Example 1 to 4 that were obtained as has been described above were tested under the following conditions. The test was a bench test of the continuously variable belt and pulley transmission shown in FIG. 3, three bearings of each example were tested under the respective conditions, and after the completion of tests, the existence of failure was verified on each bearing tested.

(Test Conditions)

Input Torque from Engine: 250 Nm (NU207 bearings), 340 Nm (the novel bearings);

Rotational Speed of Input-side Rotational Shaft (Primary Shaft): 6000 rpm;

Lubricating Oil: CVT fluid (40° C.: 35 cSt, 100° C.: 7 cSt);

Lubricating Condition: 10 cc/min;

Bearing Temperature: 120° C.;

Target Life: 500 hours (the same engine torque ratio and bearing's basic kinematic rated load ration for each bearing).

Test results are shown in Table 1 below.

TABLE 1

Roller Length; Roller Diameter Da; Roller Crowning R; Life; Existence of Failure
Examples; 1: 3/3 no failure; 2: 3/3 no failure; 3: 1/3 Roller failed; 4: 3/3 no failure; 5: 3/3 no failure; 6: 1/3 Roller failed;
Comparison Examples; 1: 3/3 Roller failed at center; 2: 3/3 roller failed; 3: 3/3 roller failed at center; 4: 3/3 roller failed.

From Table 1, as to Examples 1, 2 and 4, 5, $L^2/(Da \times R)$ is in a range of 0.015 to 0.03, and with respect to the target life of 500 hours, there was found no abnormality on any of the three bearings tested for each example, the target being attained. While the rolling surfaces of the rollers and the inner ring raceway surface were verified after the tests, ground textures remained on the surfaces, the lubricating state was good.

As to Examples 3, 6, $L^2/(Da \times R)$ obtained was 0.01 and 0.013, respectively, and with respect to the target life of 500 hours, a flaking was generated at an edge portion of the roller on one of the three bearings for each example, and L10 Life was 450 hours and 485 hours, respectively.

It is considered from the results that by setting $L^2/(Da \times R)$ to $0.015 \leq L^2/(Da \times R) \leq 0.03$, a skew and a differential slippage were suppressed on edge portion contact between the roller and the bearing rings, whereby metal contact at the edge portion was suppressed, the generation of a fresh surface was suppressed and the intrusion of hydrogen was prevented, thereby the lives of Examples became three times or more as long as those of Comparison Examples. Note that the diffusible hydrogen amount (200 to 300° C.) of Examples 1, 2, 4, 5 after the tests was 0.1 ppm or smaller. In addition, only the stripped rollers of Example 3, 6 provided the diffusible hydrogen amount of 0.7 ppm, and the intrusion of hydrogen was identified. The diffusible hydrogen amount of the non-stripped rollers was 0.3 ppm or smaller.

On Comparison Examples 1, 3, $L^2/(Da \times R)$ was 0.045 and 0.031, respectively, which are greater than the corresponding values of the examples (the full crowning amount of the rollers (the radius of curvature R) is smaller), and on all of the three bearings, the flaking was generated at the center of the roller, and when compared with the examples, L10 became one third or smaller, resulting in L10=145 hours and 147 hours, respectively. The result of the observation of the inner ring raceway surface and the roller raceway surface (the roller rolling surface) revealed that the contact width was narrowed compared with the examples, whereby the degree of surface contact was increased and the maximum contact bearing pressure at the central portion of the rolling surface of the roller was increased, resulting in the generation of an interior originating type flaking. Note that while the degree of fatigue of the inner ring is increased due to being subjected to repeated applications of stress, since the material was reinforced through heat treatment, the flaking was generated farther than the central portion of the roller. The diffusible hydrogen amount was 0.1 ppm or smaller and no intrusion of hydrogen was identified.

As to Comparison Examples 2, 4, since $L^2/(Da \times R)$ was small and 0.009 in effect on each example and they were designed close to normal bearings, the surface roughness on the roller rolling surface was large at the contact portion between the cylindrical rollers and the inner ring due to the effect of the skew and differential slippage, and flaking was generated on all of the three bearings tested in such a manner as to start as an original point a position situated close to the center about 1 to 2 mm from the edge portion where edge load is easy to be generated, with L10=96 hours, 91 hours, respectively, which disclosed that the flaking was generated at one fifth of the target life. After the tests, the diffusible hydrogen amount of the rollers was measured to obtain a high amount of 0.8 ppm, and as to the non-stripped inner rings, the diffusible hydrogen amount was increased to 0.3 ppm or smaller.

Thus, according to the roller bearing for continuously variable belt and pulley transmissions according to the invention that has been described heretofore, at least one of the raceway surface of the outer ring, the raceway surface of the inner ring and the raceway surface of the roller takes the shape of a full crowning, and that the radius curvature R of the full crowning is made to satisfy the relationship of $0.01 \leq L^2/(Da \times R) \leq 0.03$ relative to the diameter Da and the roller length L of the roller. According to this configuration, the optimal dimensions design of the bearing is enabled, and even under the condition in which the temperature is such a high temperature of, for example, 100° C. and a lubricating oil with low viscosity is used, the surface fatigue is delayed, even in case a metal contact occurs on the raceway surface which is attributed to a slippage such as skew, whereby the premature flaking can be prevented.

Then, by obtaining the optimal dimensional bearing configuration, the weight of the roller bearing can be reduced, and the optimal durability can also be secured. By selecting the bearing that is given the optical dimensional configuration that has been described above, even in case a sufficient lubricating oil amount of 20 cc/min or greater cannot be secured, the duration of life of the bearing can be satisfied, and the miniaturization and securing of high rigidity, which are needs specific to roller bearings for continuously variable belt and pulley transmissions, become compatible.

As a result, abnormal friction that occurs when the belt and the pulleys contact only at one side thereof can be prevented without enlargement of the bearing.

Note that while in the embodiments, the effectiveness was verified on the cylindrical roller bearing, the invention provides the same effectiveness even on a tapered roller bearing.

Consequently, the good roller bearing for continuously variable belt and pulley transmission can be provided which can realize a low fuel consumption continuously variable belt and pulley transmission which has the superior transmission efficiency and sufficient durability.

While the invention has been described in detail by reference to the specific embodiments, it is clear to those skilled in the art that various alterations and modifications can be made thereto.

This patent application was made based on the Japanese Patent Application (Patent Application No. P.2003-111618) which was filed on Apr. 16, 2003 and incorporates herein the contents thereof by reference.

INDUSTRIAL APPLICABILITY

Thus, as has been described heretofore, the roller bearing for continuously variable belt and pulley transmissions of the invention is effective when applied to a low fuel consumption continuously variable belt and pulley transmission which has the superior transmission efficiency and sufficient durability.

What is claimed is:

1. A roller bearing for continuously variable belt and pulley transmission used at rotational supporting portions of a continuously variable belt and pulley transmission, the roller bearing comprising:
    an outer ring raceway;
    an inner ring raceway; and
    a plurality of rollers rollably provided in a circumferential direction between the outer ring raceway and the inner ring raceway,
    wherein at least one of an outer ring raceway surface, an inner ring raceway surface and a roller raceway surface is a shape of a full crowning and
    a radius curvature R of the full crowning is made to satisfy a relationship of $0.01 \leq L^2/(Da \times R) \leq 0.03$ wherein Da represents diameter Da of the roller and L represents length of the roller.

2. A roller bearing for continuously variable belt and pulley transmission as set forth in claim 1, wherein the inner ring raceway surface is formed on a inner ring.

3. A roller bearing for continuously variable belt and pulley transmission as set forth in claim 1, wherein the inner ring raceway surface is formed on a rotational shaft.

* * * * *